(12) United States Patent
Singh et al.

(10) Patent No.: US 12,531,898 B2
(45) Date of Patent: Jan. 20, 2026

(54) TECHNIQUES FOR DETECTING AND MITIGATING SPOOFED EMAIL COMMUNICATIONS

(71) Applicant: Cisco Technology, Inc., San Jose, CA (US)

(72) Inventors: Abhishek Singh, Morgan Hill, CA (US); Shray Kapoor, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 93 days.

(21) Appl. No.: 18/474,555

(22) Filed: Sep. 26, 2023

(65) Prior Publication Data

US 2025/0106246 A1 Mar. 27, 2025

(51) Int. Cl.
*H04L 51/212* (2022.01)
*H04L 9/40* (2022.01)
*H04L 51/48* (2022.01)

(52) U.S. Cl.
CPC ........ *H04L 63/1466* (2013.01); *H04L 51/212* (2022.05)

(58) Field of Classification Search
CPC .......................... H04L 63/1466; H04L 51/212
See application file for complete search history.

(56) References Cited

U.S. PATENT DOCUMENTS

| | | | | |
|---|---|---|---|---|
| 7,802,304 B2 * | 9/2010 | Rao | ...................... | H04L 51/212 726/25 |
| 9,985,978 B2 * | 5/2018 | Smith | .................. | G06F 21/565 |
| 11,729,211 B2 * | 8/2023 | Jakobsson | ........... | H04L 63/1483 726/23 |
| 2016/0191548 A1 | 6/2016 | Smith et al. | | |
| 2019/0319905 A1 * | 10/2019 | Baggett | ................. | H04L 51/212 |
| 2019/0387004 A1 * | 12/2019 | Parekh | .................. | H04L 63/105 |
| 2020/0067976 A1 * | 2/2020 | Jakobsson | ........... | H04L 63/1483 |
| 2020/0067978 A1 * | 2/2020 | Jakobsson | ........... | H04L 63/1416 |
| 2021/0112024 A1 | 4/2021 | Everton | | |
| 2021/0152565 A1 * | 5/2021 | Greevy | ................. | H04L 63/101 |
| 2021/0344711 A1 | 11/2021 | Cleveland et al. | | |
| 2022/0086133 A1 * | 3/2022 | Killoran, Jr. | ........ | H04L 63/0807 |
| 2022/0239633 A1 * | 7/2022 | Dupont | ............... | H04L 63/0236 |
| 2022/0270199 A1 | 8/2022 | Rodriguez et al. | | |
| 2023/0155971 A1 | 5/2023 | Jakobsson | | |
| 2024/0022432 A1 * | 1/2024 | Spanier | ................. | H04L 9/3297 |
| 2024/0314163 A1 * | 9/2024 | Gopathy | ................ | G06V 30/19 |
| 2024/0333762 A1 * | 10/2024 | Sixta | ....................... | G06F 40/30 |

* cited by examiner

*Primary Examiner* — Oleg Survillo
(74) *Attorney, Agent, or Firm* — Lee & Hayes, P.C.

(57) ABSTRACT

Techniques are described herein for detecting an invalid (e.g., spoof) email before it is received by an intended recipient. In some embodiments, the techniques may involve, upon receiving an electronic communication directed to an intended recipient, determining, based on information included in the electronic communication, a claimed source entity, and determining a domain associated with the email communication. The techniques may further involve determining an owner entity associated with the domain and then determining that the electronic communication is valid based on a comparison between the owner entity and the claimed source entity. Upon determining that the electronic communication is not valid, the techniques may further comprise performing one or more mitigation techniques.

19 Claims, 7 Drawing Sheets

TECHNIQUES FOR DETECTING AND MITIGATING SPOOFED EMAIL COMMUNICATIONS

TECHNICAL FIELD

The present disclosure relates generally to techniques for an email security system to detect malicious email impersonating brands.

BACKGROUND

Electronic mail, or "email," continues to be a primary method of exchanging messages between users of electronic devices. Many email service providers have emerged that provide users with a variety of email platforms to facilitate the communication of emails via email servers that accept, forward, deliver, and store messages for the users. Email continues to be an important and fundamental method of communications between users of electronic devices as email provide users with a cheap, fast, accessible, efficient, and effective way to transmit all kinds of electronic data. Email is well established as a means of day-to-day, private communication for business communications, marketing communications, social communications, educational communications, and many other types of communications.

Due to the widespread use and necessity of email, scammers and other malicious entities use email as a primary channel for attacking users, such as by business email compromise (BEC) attacks, malware attacks, and malwareless attacks. These malicious entities continue to employ more frequent and sophisticated social-engineering techniques for deception and impersonation (e.g., phishing, spoofing, etc.). As users continue to become savvier about identifying malicious attacks on email communications, malicious entities similarly continue to evolve and improve methods of attack.

Accordingly, email security platforms are provided by email service providers (and/or third-party security service providers) that attempt to identify and eliminate attacks on email communication channels. For instance, cloud email services provide secure email gateways (SEGs) that monitor emails and implement pre-delivery protection by blocking email-based threats before they reach a mail server. These SEGs can scan incoming, outgoing, and internal communications for signs of malicious or harmful content, signs of social engineering attacks such as phishing or business email compromise, signs of data loss for compliance and data management, and other potentially harmful communications of data. However, with the rapid increase in the frequency and sophistication of attacks, it is difficult for email service providers to maintain their security mechanisms at the same rate as the rapidly changing landscape of malicious attacks on email communications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

A first method according to the techniques described herein may include, upon receiving an electronic communication directed to an intended recipient determining, by the service provider computing device based on information included in the electronic communication, a claimed source entity, determining, by the service provider computing device, a domain associated with the email communication, determining, by the service provider computing device, an owner entity associated with the domain, determining, by the service provider computing device, that the electronic communication is valid based on a comparison between the owner entity and the claimed source entity, and upon determining that the electronic communication is not valid, performing, by the service provider computing device, one or more mitigation techniques.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques that may be performed to detect, and mitigate risks for, spoofed email communications. Spoofed email communications may be communications that claim to be associated with a particular source entity that are sent without the authority of that source entity.

The described email service platform may be configured to identify scam emails, which are often are designed to impersonate legitimate brands and are sent from the attackers to facilitate the scam. For instance, an initial email may be sent from the attacker that includes a request for the target user to perform an action based on the type of scam. In this instance, the initial email may request a gift card code, may request a wire transfer, may request that salary be deposited into a different bank account, list of unpaid invoices, W-2 details of employee(s), sensitive information of clients, and so forth. Accordingly, impersonation (e.g., fraudulent) emails may need to be processed to determine the legitimacy of the email.

In the described email security system, an email is processed to determine whether the sender of the email communication matches a claimed source entity of the email. To do this, the email security system identifies a claimed source entity (e.g., a brand or business entity) as well as a domain associated with the email (e.g., based on a sender address or a link included in the email). The email security system can then identify an owner entity of the domain associated with the email based on information provided by a trusted third-party. The email communication may be determined to be spoofed if a determination is made that the owner entity does not match the claimed source entity.

Embodiments of the disclosure provide for a number of advantages over conventional systems. For example, embodiments enable an email server to automatically identify and mark emails as potentially being spoofed in a quick and unintrusive manner. In some spoofed emails, an unauthorized entity may include information about brands (e.g., logos) within an image in order to evade text-based spoofing detection. The techniques described herein use methods that are advantageous over conventional spoofed email detection techniques in that they are able to identify scenarios in which brand logos are used in an unauthorized manner, even if the email does not mention the brand outside of images included in the email. Furthermore, embodiments of the system as described herein allow for spoof detection to be performed without the need to maintain a list or database of authorized entities for a particular brand.

Figure 1:
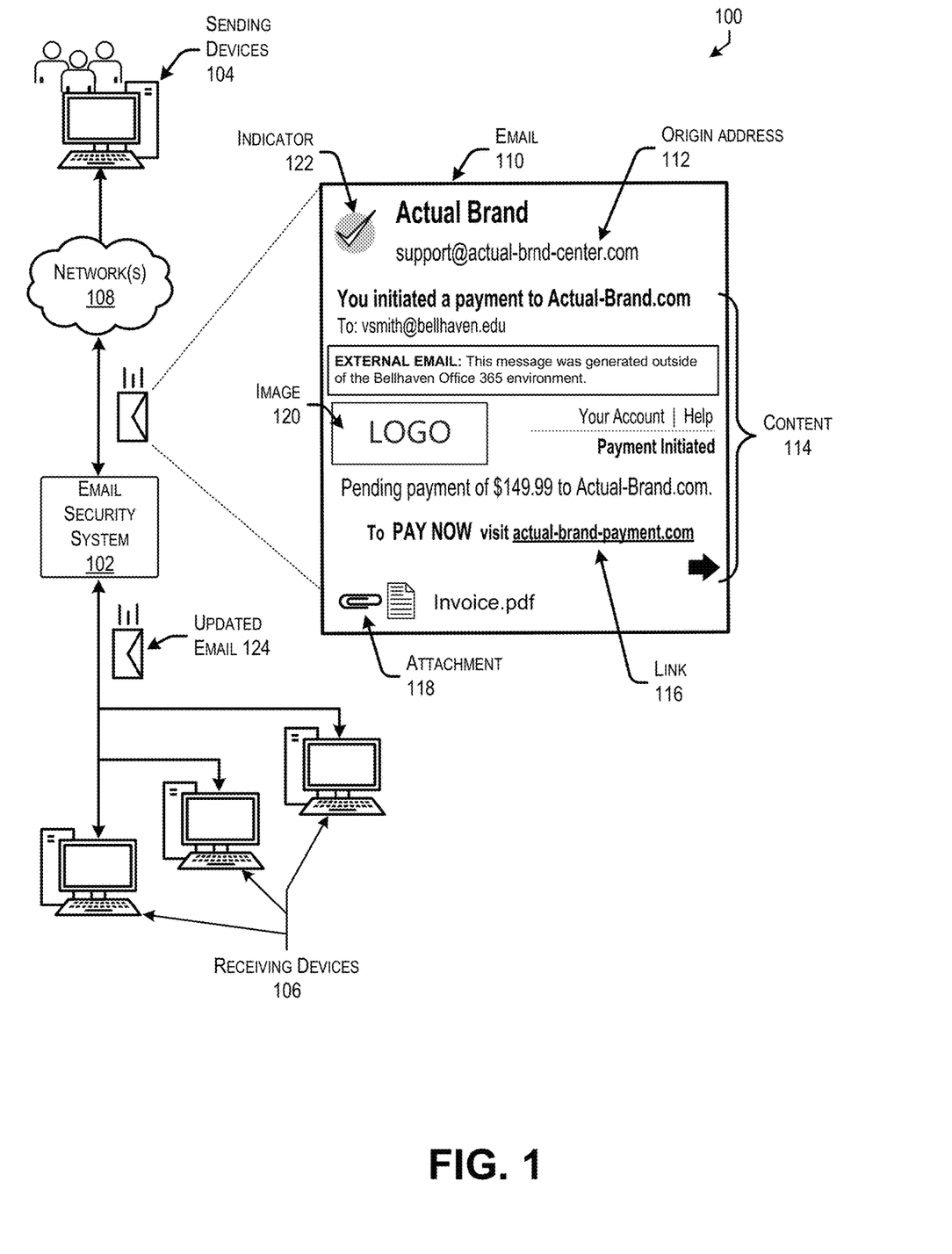
FIG. 1 illustrates a system-architecture diagram 100 of an example email service platform configured to detect and classify an email as being potentially fraudulent in accordance with at least some embodiments.

FIG. 1 illustrates a system-architecture diagram 100 of an example email service platform configured to detect and classify an email as being potentially fraudulent in accordance with at least some embodiments. In embodiments, such an example email service platform may include an email security system 102 to operate between one or more sending devices 104 and one or more receiving devices 106 via a network 108.

In some instances, the email security system 102 may be a scalable service that includes and/or runs on devices housed or located in one or more data centers, that may be located at different physical locations. In some examples, the email security system 102 may be included in an email platform and/or associated with a secure email gateway platform. The email security system 102 and the email platform may be supported by networks of devices in a public cloud computing platform, a private/enterprise computing platform, and/or any combination thereof. The one or more data centers may be physical facilities or buildings located across geographic areas that are designated to store networked devices that are part of and/or support the email security system 102. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth).

The email security system 102 may be associated with an email service platform and may generally comprise any type of email service provided by any provider, including public email service providers (e.g., Google Gmail, Microsoft Outlook, Yahoo! Mail, AIL, etc.), as well as private email service platforms maintained and/or operated by a private entity or enterprise. Further, the email service platform may comprise cloud-based email service platforms (e.g., Google G Suite, Microsoft Office 365, etc.) that host email services. However, the email service platform may generally comprise any type of platform for managing the communication of email communications between clients or users. The email service platform may generally comprise a delivery engine behind email communications and include the requisite software and hardware for delivering email communications between users. For instance, an entity may operate and maintain the software and/or hardware of the email service platform to allow users to send and receive emails, store and review emails in inboxes, manage and segment contact lists, build email templates, manage and modify inboxes and folders, scheduling, and/or any other operations performed using email service platforms.

The email security system 102 may be included in, or associated with, the email service platform. For instance, the email security system 102 may provide security analysis for emails communicated by the email service platform (e.g., as a secure email gateway). Furthermore, a second computing infrastructure may comprise a different domain and/or pool of resources used to host the email service platform.

The email service platform may provide one or more email services to users of user device to enable the user devices to communicate emails. Sending devices 104 may communicate with receiving devices 106 over one or more networks 108, such as the Internet. In some instances, the network(s) 108 may generally comprise one or more networks implemented by any viable communication technology, such as wired and/or wireless modalities and/or technologies. The network(s) 108 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 108 may include devices, virtual resources, or other nodes that relay packets from one device to another.

As illustrated, the user devices may include the sending devices 104 that send emails and the receiving devices 106 that receive the emails. The sending devices 104 and receiving devices 106 may comprise any type of electronic device capable of communicating using email communications. For instance, the devices 104/106 may include one or more of different personal user devices, such as desktop computers, laptop computers, phones, tablets, wearable devices, entertainment devices such as televisions, and/or any other type of computing device. Thus, the user devices 104/106 may utilize the email service platform to communicate using emails based on email address domain name systems according to techniques known in the art.

The email service platform may receive emails that are destined for the receiving device 106 that have access to inboxes associated with destination email addresses managed by, or provided by, the email service platform. That is, emails 110 are communicated over the network(s) 108 to one or more recipient servers of the email service platform, and the email service platform determines which registered user the email is intended for based on email information included in a header, such as "To," "Cc," Bcc," and the like. In instances where a user of the receiving device 106 has registered for use of the email security system 102, an organization managing the user devices 104/106 has registered for use of the email security system 102, and/or the email service platform itself has registered for use of the email security system 102, the email service platform may provide the appropriate emails to the front end for pre-preprocessing of the security analysis process.

In embodiments, the email security system 102 is configured to process an email 110 received from a sending device 104 to detect and provide an indication of spoofed emails. In these embodiments, the email security system 102 may be configured to identify a claimed source of origin (e.g., a business or other entity) for the email 110 in order to ascertain whether an owner entity for a domain associated with the email is a match. Based on such a determination, the email security system 102 may be configured to update the email to include an indicator 122 of whether that email is authentic.

In some embodiments, the email security system 102 is configured to identify a domain associated with the email. In some cases, such a domain may be identified by virtue of its association with an origin address 112. The origin address 112 represents a point of origin for the email, in that it indicates an account from which the email was sent. In one example, the origin address 112 may be obtained from a header of the email 110. In another example, the origin address 112 may be obtained from a return-path address as indicated in information received in relation to the email 110. In some cases, the origin address 112 may be made up of a user identifier and an internet domain identifier (e.g., a domain). In some cases, the origin address 112 may be an internet protocol (IP) address.

In some embodiments, a domain associated with the email may be identified by virtue of being associated with a link 116, or other suitable type of reference, included in the email. In some embodiments, a link 116 may be a Uniform Resource Locator (URL) that references a webpage to which a device selecting the link may be directed. In such cases, a domain associated with the email may be identified as the one on which the webpage is hosted.

Additionally, the email security system 102 is configured to identify content 114 within a body and or an attachment 118 of the email 110. Such content 114 may include a combination of text and/or images 120 that form a message to an intended recipient of the email 110. The security system 102 is configured to determine, based on the content 114, a claimed source entity of the email 110. For example, an image 120 may be assessed by the security system 102 to determine the claimed source entity of the email. In this example, the image 120 may be subjected to one or more machine learning models to determine a company or other organization represented by a logo or other depiction within the image 120. In some cases, a determination of the claimed source of the email may be determined based on a context or semantics identified for the content 114.

In some cases, an email 110 may further include an attachment 118. Such an attachment might include any suitable computer-readable document that is sent along with (e.g., attached to) an email communication. In some embodiments, the email security system 102 may be configured to open, or otherwise access, content included within an attachment 118 during performance of the techniques described herein. In some cases, an attachment may include a combination of text and/or image data. In embodiments in which an attachment 118 includes text data, such text data may be parsed by the email security system 102. In embodiments in which an attachment 118 includes image data, one or more computer vision techniques (e.g., optical character recognition) may be used to identify information included in the attachment. In some embodiments, the email security system 102 may be configured to determine a domain associated with the email and/or a claimed source entity based on information included in the attachment 118.

In embodiments, the email security system 102 may be configured to, upon identifying a domain associated with an email, identify an owner entity associated with that email. In some embodiments, this may involve submitting a query to a trusted third-party service provider to determine an owner of the domain associated with the email. In other words, the email security system 102 may provide an indication of the domain to the trusted third-party service provider (e.g., an Internet Corporation for Assigned Names and Numbers (ICANN) server or other suitable registry service provider) and cause it to look up the current registration data for the domain. For example, the email security system 102 may perform a "whois" lookup on the domain. In these embodiments, the email security system 102 may be further configured to determine an owner entity for the domain based on a response that is received in relation to the query.

Upon determining a claimed source of origin for the email 110 based on the content 114 of the email, the email security system 102 is configured to determine whether the claimed source entity matches an owner entity as determined from the domain. In some cases, this may involve determining a degree of similarity between the owner entity and the claimed source entity. In some cases, a match may be determined based not only on how similar the two entities are determined to be, but also based on how they differ. For example, if the only difference between the two entities is an indication of a type of business entity (e.g., llc, Inc., llp, C., etc.) then a determination may be made that the two entities are a match. If, on the other hand, the entities are determined to have a different spelling (e.g., missing or extra letters, a number instead of a letter, etc.) then a determination may be made that the two entities are not a match.

Upon determining whether the claimed source entity of the email matches an owner entity associated with a domain for the email, the email security system 102 may be configured to update the email 110 to include an indicator 122 that provides an indication as to whether the email 110 is likely a spoofed email based on whether the owner entity matches the claimed source of origin. Once the email 110 has been updated to include such an indicator 122, the updated email 124 may then be routed to the intended recipient (e.g., receiving device 106).

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
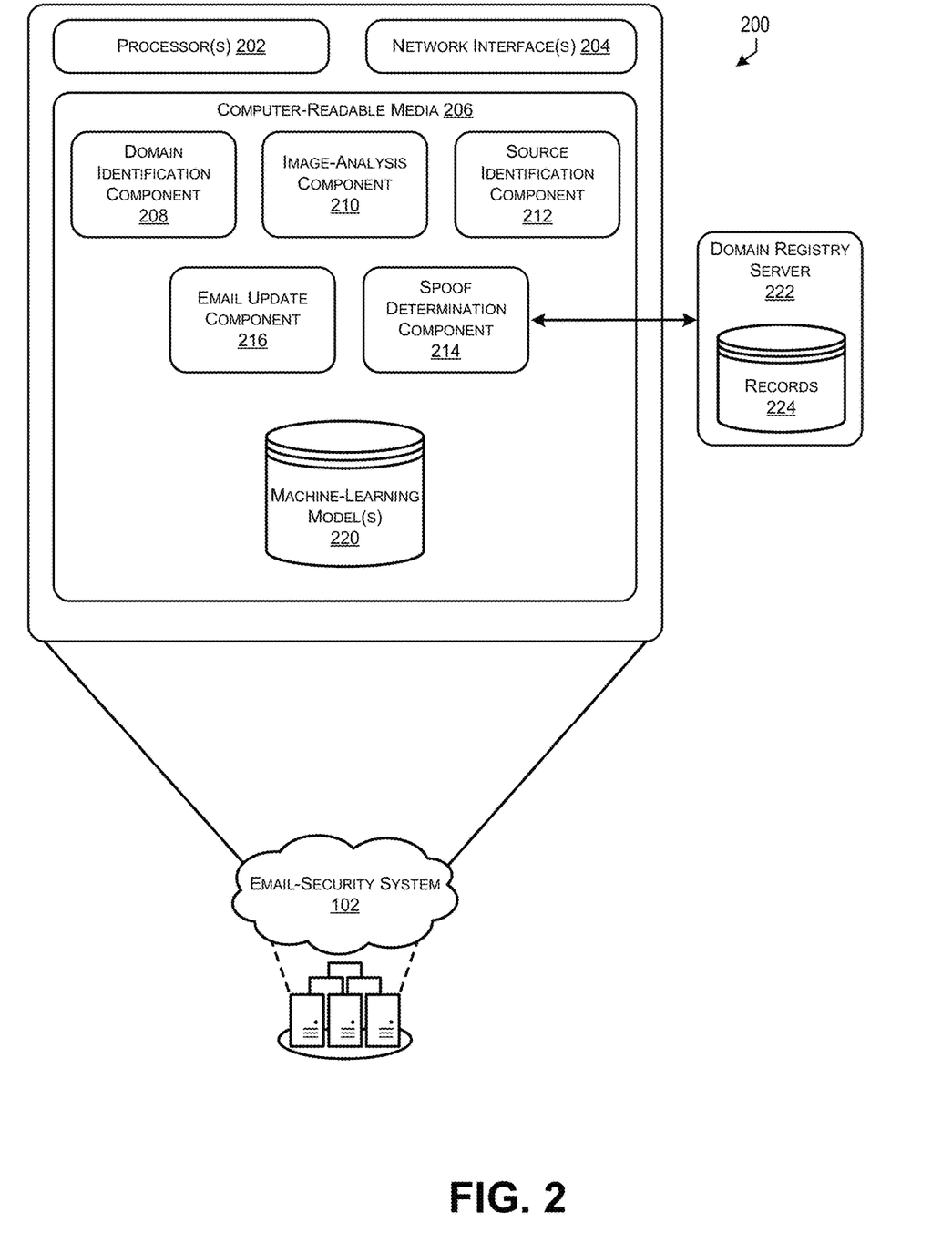
FIG. 2 depicts a component diagram of an example email security system 102 that detects and classifies an email indicating whether the email is likely a spoof based on whether an owner entity associated with the email matches a claimed source entity.

FIG. 2 depicts a component diagram 200 of an example email security system 102 that detects and classifies an email indicating whether the email is likely a spoof based on whether an owner entity associated with the email matches a claimed source entity. As illustrated, the email security system 102 may include one or more hardware processors 202 (processors) configured to execute one or more stored instructions. Such processor(s) 202 may comprise one or more processing cores. Further, the email security system 102 may include one or more network interfaces 204 configured to provide communications between the email security system 102 and other devices, such as the sending device(s) 104, receiving devices 106, and/or other systems or devices associated with an email service providing the email communications. The network interfaces 204 may include devices configured to couple to a network 108, which might include personal area networks (PANs), wired and wireless local area networks (LANs), wired and wireless wide area networks (WANs), and so forth. For example, the network interfaces 204 may include devices compatible with Ethernet, WiFi™, and so forth.

The email security system 102 may also include computer-readable media 206 that stores various executable components (e.g., software-based components, firmware-based components, etc.). The computer-readable media 206 may store components to implement functionality described herein. While not illustrated, the computer-readable media 206 may store one or more operating systems utilized to control the operation of the one or more devices that comprise the email security system 102. According to one instance, the operating system comprises the LINUX operating system. According to another instance, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

The computer-readable media 206 may include portions, or components, that configure the email security system 102 to perform various operations described herein. For example, the computer-readable media 206 may include some combination of a domain identification component 208 configured to identify a sender of an email communication, an image analysis component 210 configured to provide analysis of images included in an email communication, a source identification component 212 configured to identify a claimed source entity of an email, a spoof determination component 214 configured to determine whether the sender of the email communication is authorized to send emails on behalf of a source entity, and/or an email update component 216 configured to update an email communication to include an indication of authorization. Additionally, the computer-readable media 206 may include information included in one or more databases. For example, the computer-readable media 206 may further include one or more machine learning model(s) 220 trained to correlate email content with a claimed source entity and/or a database of known brand logo data that includes information about various brand names/brand logo images.

A domain identification component 208 may be configured to, when executed by the processor(s) 202, identify one or more domains associated with the email. In some cases, a domain associated with the email may be determined based on a sender address for the email. In some cases, a domain associated with the email may be determined based on one or more links included in the email.

In some embodiments, the sender address may be identified as one or more of a "Display Name" and/or "From" field of the email communication. In some cases, the domain identification component 208 is configured to determine the sender address based on information about a return-path address associated with the email communication. The domain identification component 208 may be configured to determine a domain associated with the sender address based on information included in that sender address.

In some embodiments, the domain identification component 208 is configured to identify a domain associated with the email based on one or more links included in the email. For example, the domain identification component 208 may identify one or more URLs within the content of the email, within an image in the email, or within an attachment included in the email. The domain identification component 208 may then identify a domain associated with the email as the domain that is hosting the content linked to by the URLs. In the event that multiple different domains are identified in this manner, the domain identification component 208 may be configured to rank or otherwise prioritize the various domains in order to identify a domain associated with a link that most likely represents an owner entity for the email. In some cases, this may involve analyzing a context in which each of the links is presented. In such cases, a link that is associated with a "call to action" may be given a higher priority than a link that is presented in the content of the email.

An image analysis component 210 may be configured to, when executed by the processor(s) 202, perform various techniques for analyzing images within an email communication. In one example, such techniques may include optical character recognition techniques that can be used to identify text included within the one or more images. In another example, such techniques may include computer vision techniques that are used to compare the image in an email with known images (e.g., known brand logo data). In some embodiments, the image analysis component 210 may utilize various models for extracting information about a claimed source entity from image data. Such models may include, but are not limited to, a Convolutional Neural Network (CNN), a Vision Transformer AI model, or a Contrastive Language-Image Pre-training (CLIP) Model.

A source identification component 212 may be configured to, when executed by the processor(s) 202, perform various techniques for determining a claimed source entity of an email communication. In embodiments, the source identification component 212 may be configured to determine whether the email communication is claiming to have originated from, or be associated with, a claimed source entity such as a brand or domain. Such a determination may be made based on the usage of brand names or logos within the email communication as well as a context in which the brand name or logo is used. For example, a determination may be made that an email communication is claiming to be associated with a source entity based on the presentation of an image that includes a logo for that source entity within the body of the email and/or within an attachment of the email. Alternatively, such a determination may be made based on the inclusion of the brand name or logo in a signature of the email. In some embodiments, the source identification component 212 may be configured to identify brand names within an email communication. Upon identifying such brand names within the email, the source identification component 212 may be configured to determine whether the email claims the brand name as a source based on a context (e.g., a position and/or semantics) in which the brand name is presented.

In some embodiments, the source identification component 212 may use one or more trained machine-learning models 220 to identify a claimed source entity. In such embodiments, some portion of the content of the body and/or attachment of the email communication may be provided as input to the one or more trained machine-learning models 220, which may then output an indication of a likelihood that a source entity referenced in the email communication is a claimed source entity.

A spoof determination component 214 may be configured to, when executed by the processor(s) 202, perform various techniques for determining whether a determined owner entity associated with an email matches a claimed entity source. To do this, the spoof determination component 214 may communicate with a domain registry server 222. More particularly, upon identifying a domain (e.g., via the domain identification component 208) for the email, the spoof determination component 214 may be configured to retrieve records 224 (e.g., owner/registration records) maintained by the domain registry server 222 in relation to the domain. Based on these records, the spoof determination component 214 is configured to identify a likely owner entity for the domain associated with the email. Upon identifying this owner entity, the spoof determination component 214 makes a determination as to whether the email is likely a spoof based on whether the determined owner entity matches the claimed source entity.

An email update component 216 may be configured to, when executed by the processor(s) 202, perform various techniques for providing an indication that the email is, or is not, likely to be valid. In the scenario in which the email communication is determined to be valid, the email update component 216 may be configured to add a marking (such as a logo or watermark) indicating that the email is an authorized email. In the scenario in which the email communication is determined not to be valid, the email update component 216 may be configured to add a notification indicating that the email is likely not a valid email (e.g., the email may be a spoof email).

Figure 3:
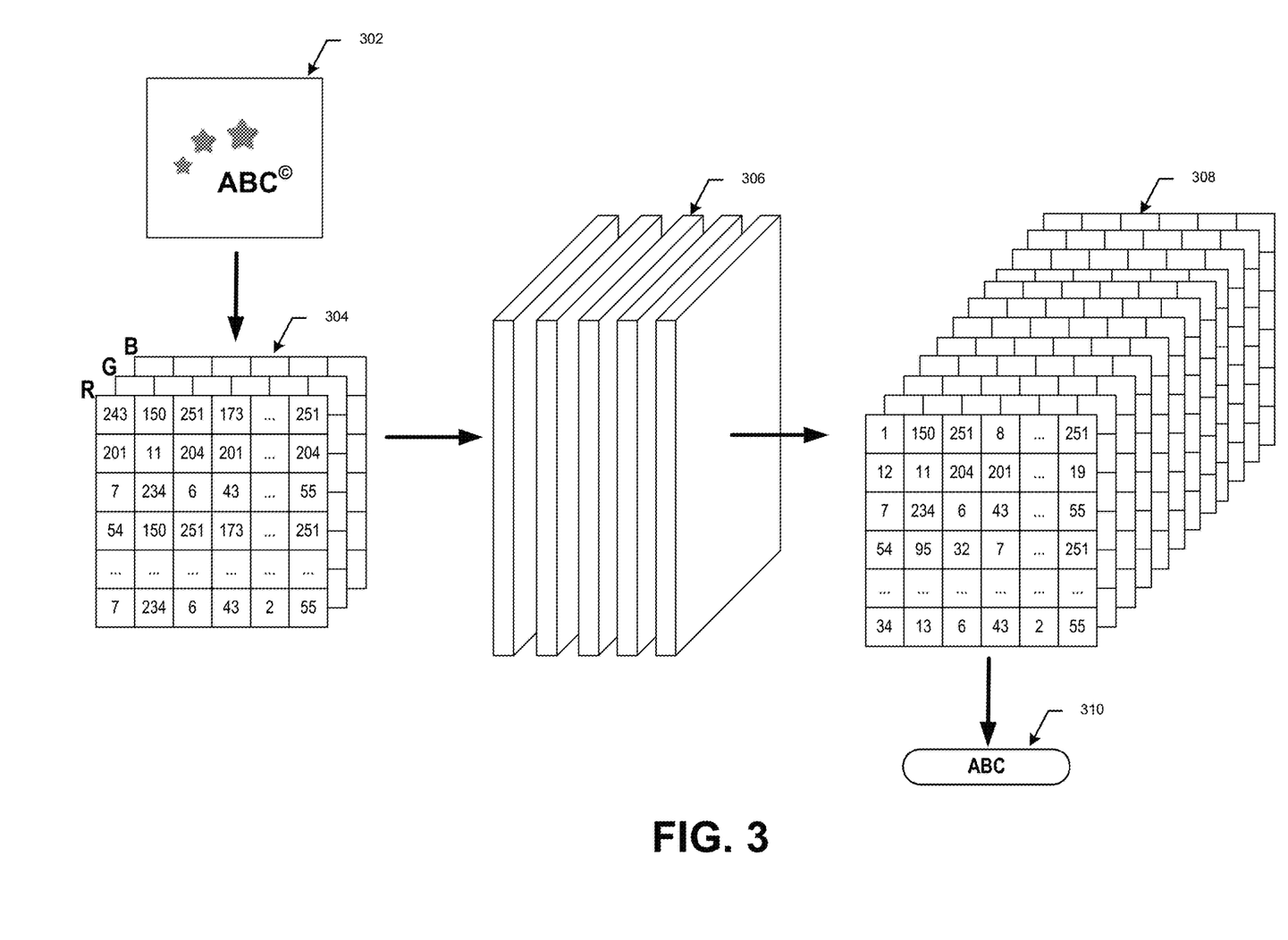
FIG. 3 illustrates the use of one or more machine learning model to map image data as input to claimed source entity as output in accordance with embodiments.

FIG. 3 illustrates the use of one or more machine learning model to map image data as input to claimed source entity as output in accordance with embodiments. As noted elsewhere, such machine learning models may include, but are not limited to, a Convolutional Neural Network (CNN), a Vision Transformer AI model, or a Contrastive Language-Image Pre-training (CLIP) Model.

In embodiments, an image-analysis component may be configured to, given an image 302 identified within an email, generate image data 304. An image may represent, for example, a digital image, a channel of a digital image, or a feature map generated by a layer in a convolutional neural network. The image data 304 may include information determined about one or more pixels included in an image. In some cases, such information for the image data may be derived from metadata associated with the image.

In some cases, image data 304 may include information arranged into one or more data arrays. In these cases, such information may be information that corresponds to a respective portion of the image. By way of example, the image data 304 may be generated to include separate data arrays that correspond to each of red, green, and blue values for the image data. In this example, the arrays may each contain a number of rows and columns that correspond to the pixels included in the image data. Each of the fields in the rows and columns may be populated with a data value representative of the respective value in that pixel. In such embodiments, the image data may include a red array in which fields (having a particular row and column value) that are populated with data values representative of a red value for the pixel corresponding to the field in the image data.

In embodiments, image data 304 may be provided as input to a neural network 306 (e.g., a convolutional neural network). The neural network 306 may include a number of layers that are each made up of a plurality of nodes. Such a number of layers may include an input layer, an output layer, and one or more hidden (or intermediate) layers. In many implementations, a neural network that includes two or more hidden layers may be referred to as a deep neural network. A neural network with a single hidden layer may generally be sufficient to model any continuous function. However, such a network may need an exponentially larger number of nodes when compared to a neural network with multiple hidden layers.

The nodes included in the hidden layer may have no direct connection with the external entities (hence the name "hidden"). Each of the multiple nodes in a layer may perform computations and transfer information from the input nodes to the next layer (e.g., another hidden layer or output layer) eventually resulting in the generation of the output layer.

In embodiments, the data values included in various fields of the image data 304 may be used as input to one or more neural network. For example, each node of an input layer may be populated with a data value included in the image data 304. Each of hidden layers of the neural network 306 may then perform various computations on that input layer data in turn to generate a number of feature maps (e.g., feature map data 308). Feature mapping is a technique used in data analysis and machine learning to transform input data from a lower-dimensional space to a higher-dimensional space, where it can be more easily analyzed or classified. Each feature map in the feature map data 308 may be a matrix of data values. The feature map data 308 may therefore include a number of matrices (e.g., convolution output matrices) that are representative of the image data.

Feature map data 308 may then be processed to determine a claimed source entity associated with the image data. In some cases, this may involve providing the feature map data 308 to a second machine learning model (e.g., neural network) that is configured to correlate feature map data with text.

Figure 4:
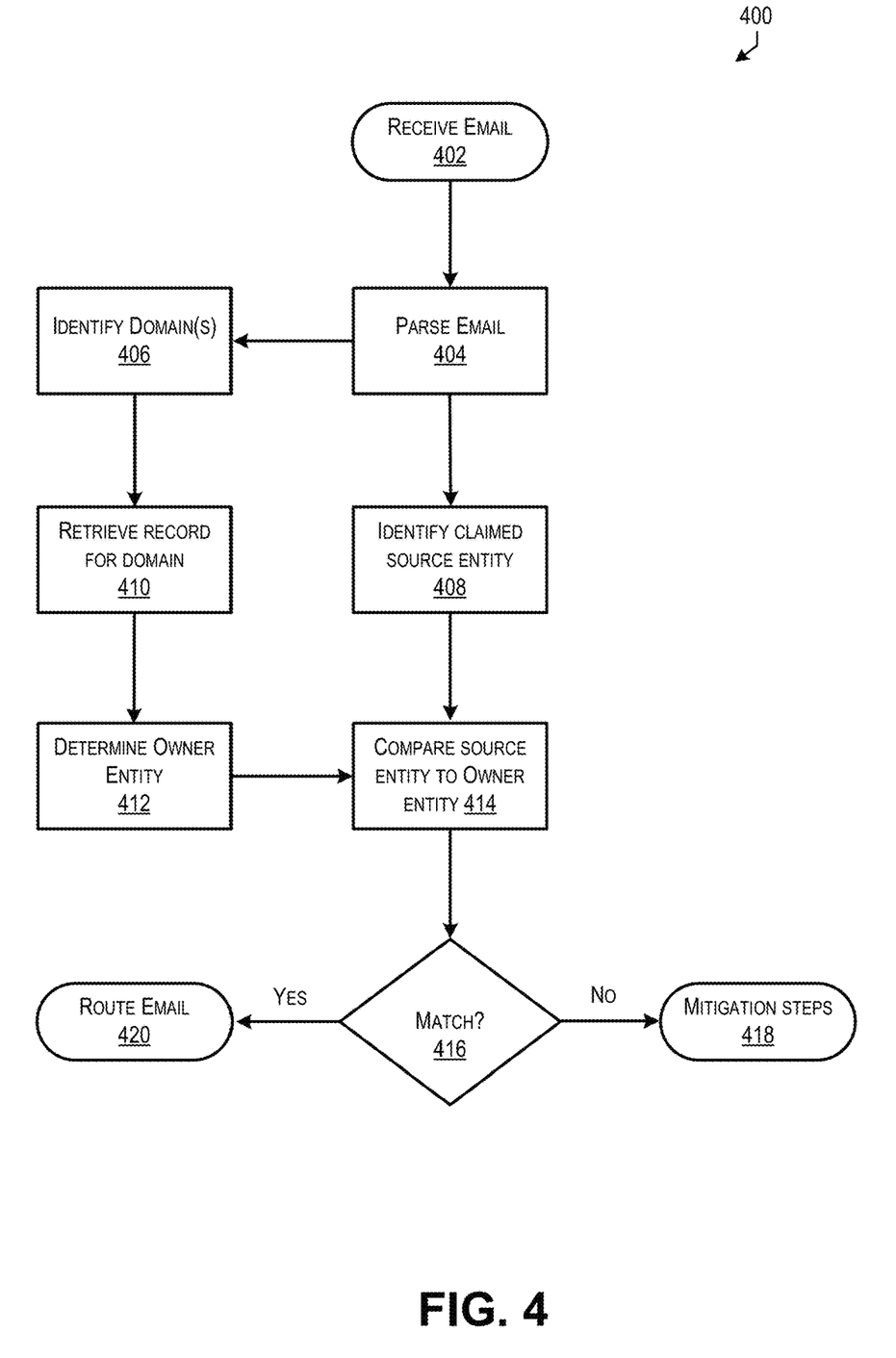
FIG. 4 depicts a block diagram illustrating an example process for determining whether an email received from a sender is likely to be valid in accordance with at least some embodiments.

FIG. 4 depicts a block diagram illustrating an example process for determining whether an email received from a sender is likely to be valid in accordance with at least some embodiments. The process 400 may be performed by an email security system (e.g., the email security system 102 as described in relation to FIG. 1) upon receiving an email communication.

At 402, the process 400 may involve receiving, at an email security system, an electronic communication from a first computing device and associated with an email account. As noted elsewhere, such an electronic communication might include an email communication. In some embodiments, the email security system may be implemented on an edge device of a local network (e.g., acting as an ingress/egress to the local network), such that emails directed toward computing devices operating on the local network are received and processed by the email security system. In some embodiments, the email security system is implemented on an email exchange server configured to route email communications between accounts/computing devices.

At 404, the process 400 may involve parsing the email communication to identify a number of elements within that email communication. Particularly, the process 400 may involve identifying, based on information included in the email, at least one domain as described in greater detail at 406 as well as a claimed source entity as described in greater detail at 408.

At 406, the process 400 may involve determining at least one domain for the email communication based on information included in the email. In some embodiments, a domain may be determined based on a sender email address included in the email communication (e.g., as included within a header of the email communication). In some embodiments, a domain may be determined based on a return-path address as indicated in information received in relation to the email. In general, a return path is used to specify where bounced emails are sent and is included within the header of an email communication. A return-path address may be a hidden Simple Mail Transfer Protocol (SMTP) address that is separate from the sender email address. In some embodiments, a domain may be determined based on or more links included in the email. For example, the process may involve identifying one or more URLs included in some portion of the email and identifying a domain based on a location to which the URL is directed.

At 408, the process 400 may involve identifying a claimed source entity to be associated with the email communication. In some embodiments, this may involve parsing the contents of the email communication (as included in some combination of the header, body, and/or an attachment). The parsed content, or at least a portion thereof, may then be provided to one or more software components that is configured to determine a source entity being claimed by the email communication. In some embodiments, this may involve identifying brand names within text of the email communication and determining (e.g., using natural language processing and/or sentiment analysis) that those brand names are being claimed as a source of the email communication. In some embodiments, this may involve identifying one or more images included within the email communication and further identifying a brand that can be attributed to those images (e.g., using one or more computer vision and/or optical character recognition techniques). In these embodiments, a determination may be made as to whether a source entity (e.g., a brand) attributed to an image is being claimed as a source of the email communication. For example, a position and/or size of the image in relation to the email body and/or attachment may indicate that the entity associated with the image is being claimed as a source entity.

At 410, the process 400 may involve, upon identifying at least one domain for the email communication, retrieving records indicating ownership/registration information for the domain. For example, the email security system may communicate with a domain registry (e.g., ICANN) to obtain a record that pertains to the domain. More particularly, the record may include a certificate or other registration document that pertains to a webpage associated with the domain.

In some embodiments, the email security system may assess one or more certificates related to the domain. For example, the email security system may visit the website and inspect a Secure Sockets Layer (SSL) certificate associated with the website/domain. An SSL certificate is a digital certificate that authenticates a website's identity and enables an encrypted connection. Since a visitor to a website is presented with the SSL in order to enable secure communication, the email security system may, by visiting the website, inspect the SSL certificate in order to identify the owner entity to which the domain is registered. In these cases, the owner entity may be determined from the "Common Name (CN)" field of the "Issued To" section of the SSL certificate when viewed.

At 412, the process 400 may involve determining an owner entity associated with the email. As described elsewhere, the owner entity may be determined by virtue of being associated with the domain (e.g., as indicated via the retrieved records).

At 414, the process 400 may involve comparing the determined owner entity to the claimed source entity to determine if they match. More particularly, this may involve comparing a string of characters representative of each of the two entities to identify a degree of similarity between the two. In some embodiments, a match is determined at 416 if a similarity between the two strings of characters is greater than a threshold similarity value.

Upon a determination that the determined owner entity does not match the claimed source entity of the email communication (e.g., "No" at step 416), the process 400 may further involve taking one or more mitigation steps at 418. Such mitigation steps may include any suitable method of limiting exposure of the email's recipient to fraud or other risk. For example, mitigation steps may involve blocking, or otherwise preventing routing of, the email communication by preventing the email communication from being transmitted to the intended recipient. In another example, mitigation steps may involve adding an indicator to the email that conveys that the sender of the email is likely not associated with the claimed source entity of the email communication. Such an indicator may take any suitable form.

Upon a determination that the determined owner entity does match the claimed source entity the email communication (e.g., "Yes" at step 416), the process 400 may further involve routing the email to its intended recipient at 420. In some embodiments, the email security system may be further configured to update the email to include some indicator that the email is likely valid. For example, the email security system may add an image or other indicator to the email to certify the authenticity of the email before routing that email to the intended recipient.

Figure 5:
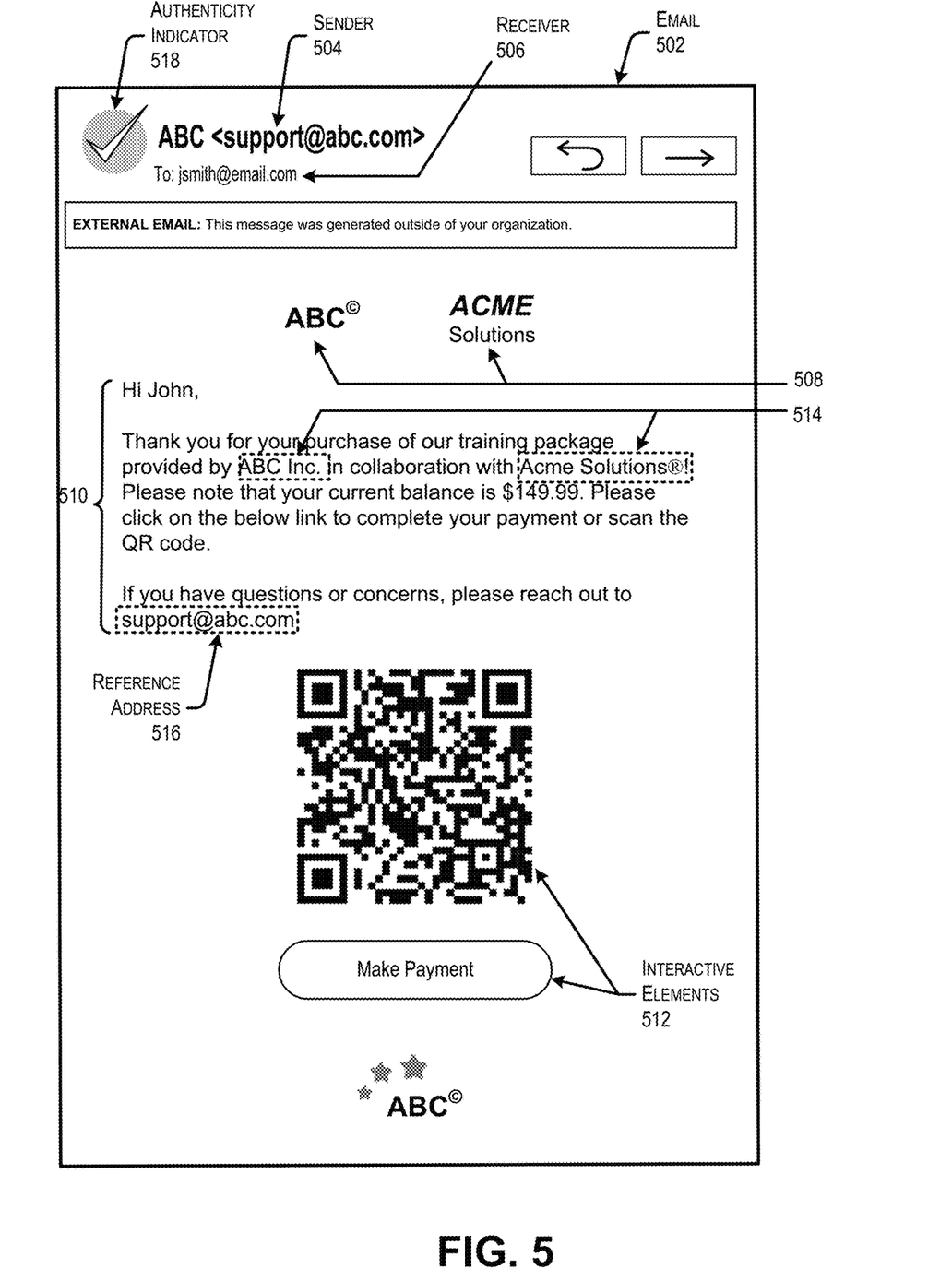
FIG. 5 depicts various elements of an exemplary email that may be processed using an email security system as described herein in accordance with at least some embodiments.

FIG. 5 depicts various elements of an exemplary email that may be processed using an email security system as described herein in accordance with at least some embodiments. As described elsewhere, an email security system (e.g., email security system 102 as described in relation to FIG. 1) may receive an email 502. Such an email 502 may include at least a header and a body, as well as a number of attachments.

An exemplary header for an email 502 may include at least an indication of a sender address 504 and an indication of a receiver account 506. It should be noted that a sender address might be made up of an account identifier and a domain identifier and may be identified at least in part based on the information included in a sender address 504 field indicated within the header.

An exemplary body for an email 502 may include a number of elements. Particularly, a body for an email may include one or more images 508, textual information 510, and one or more interactive elements 512. Note that while content is described herein as being obtained from a body of the email 502, such content may also be obtained from within an attachment associated with the email 502 (e.g., a text or image-based document).

As noted elsewhere, the images 508 may include logos or other representations of a source entity (e.g., a brand). In these cases, the position of the image(s) within the body (or attachment) of the email 502 may be used to make a determination as to whether the email is claiming to be associated with the source entity depicted in such an image. For example, if the image of a brand logo is positioned at the top and center of an email body, then a determination may be made that the email is likely claiming to be associated with the brand. In another example, if the image of a brand logo is positioned in a signature position of an email body, then a determination may also be made that the email is likely claiming to be associated with the brand.

In some cases, the email may include multiple logos or images depicting different brands/text data. Textual information 510 included in an email may include a number of words and/or phrases that can be used to make a determination as to which, if any, images relate to a claimed source entity. In some embodiments, such a determination may be made by detecting entity usage 514 within the textual information and assessing a context in which the entity usage 514 is presented. In some cases, entity usage 514 may be identified by comparing words and/or phrases to a list of known brand names. In some cases, entity usage 514 may be identified based on a format in which it is presented within the textual information 510. For example, a word and or phrase may be identified as a potential entity usage 514 if it is capitalized and/or followed by a copyright or trademark symbol (e.g., © or ®).

In some embodiments, where multiple images are included in an email that each relate to a different claimed source entity, a list of potential claimed source entities may be generated. In some cases, the source entities on such a list are ranked based on a likelihood of being the claimed source entity in order to identify the source entity with the highest likelihood as the claimed source entity. In some cases, the email security system may compare each of the source entities on such a list to an owner entity determined to be associated with the email in order to identify a match.

As noted elsewhere, the email system may be configured to determine a domain associated with the email. In some cases, the textual information may include an indication of a referenced address link 516. As noted elsewhere, in some cases a domain may be ascertained based on a domain included in the link 516 (e.g., "abc.com" in the depicted example). In some cases, a domain may be ascertained from a sender address 504 as included in the header. In some cases, a link from which a domain is to be ascertained may be associated with an interactive element 512.

Interactive elements 512 included in an email may include buttons, machine-readable codes, or other suitable interaction mechanisms that allow a user to quickly interact with information presented in the email. In some case, while it may not be readily visible to a user that is reading the email, such an interactive element 512 may be associated with a link (e.g., a URL or other reference) that is accessed upon interaction with the interactive element 512. In these embodiments, a website or domain associated with such a link may be determined to be associated with the email.

In some embodiments, an email security system may be configured to update the email to include one or more elements. For example, in some embodiments, the email security system may be configured to add an authenticity indicator 518 to the email 502 that indicates whether the email is determined to have been sent by an entity that is authorized to send emails on behalf of a claimed source entity determined from the content of the email 502.

Figure 6:
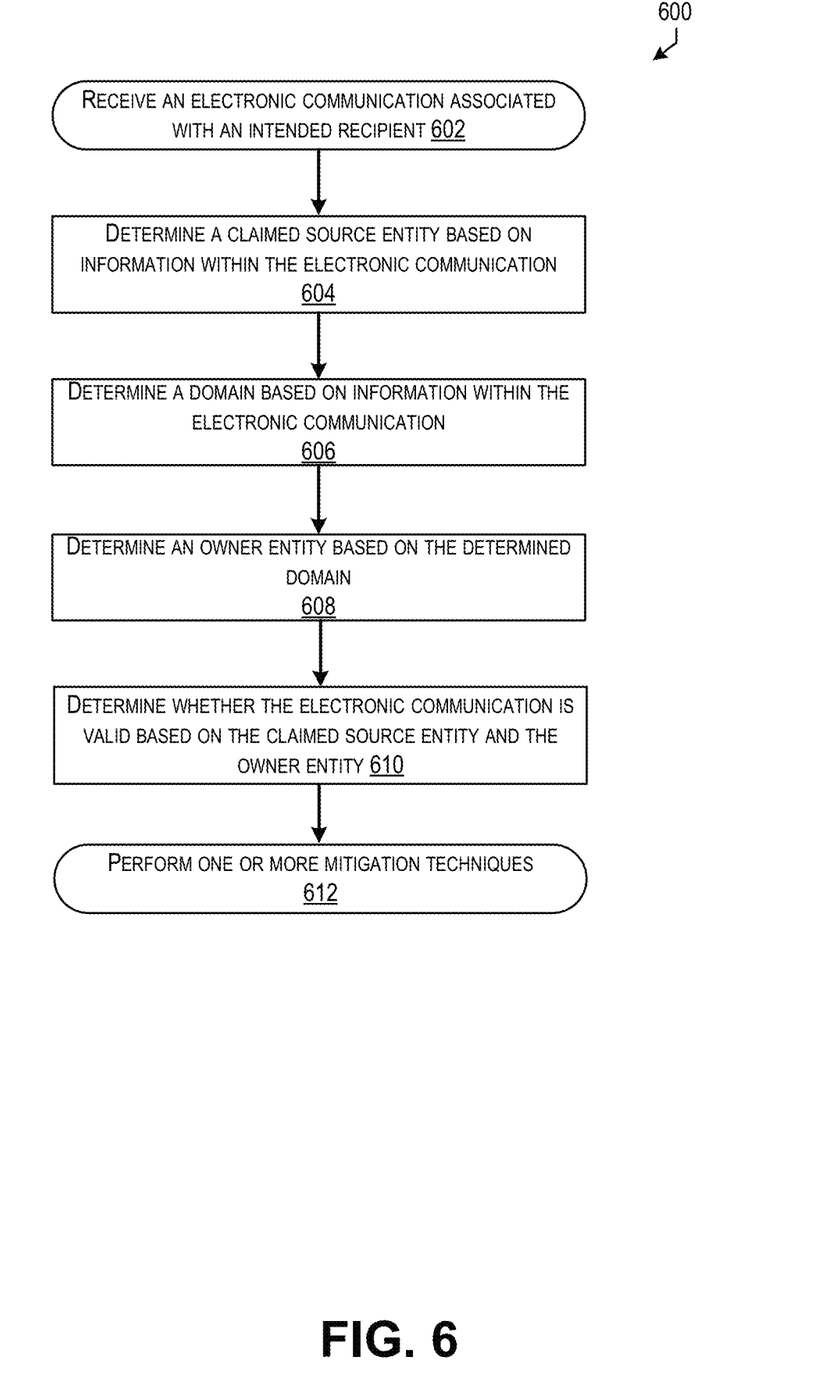
FIG. 6 depicts a flow diagram illustrating an exemplary process for identifying and indicating whether an email communication is likely valid in accordance with at least some embodiments.

FIG. 6 depicts a flow diagram illustrating an exemplary process for identifying and indicating whether an email communication is likely valid in accordance with at least some embodiments. The process 600 may be performed by an email security system, such as the email security system 102 as described in relation to FIG. 1 above.

At 602, the process 600 may involve receiving an electronic communication associated with an intended recipient address. In some embodiments, the electronic communication includes an origination address that may be determined from one of a sender address included in a header of the email communication or a return-path address for the email communication. As noted elsewhere, an email may originate from a sender account and may be directed to a receiver account.

At 604, the process 600 may involve determining a claimed source entity to be associated with the electronic communication. In some embodiments, the claimed source entity is determined based on information included in one or more images included in the electronic communication. For example, the one or more images included in the electronic communication may be determined to correspond to a logo for a brand entity. In this example, the claimed source entity may be the brand entity depicted in the images. In some cases, the claimed source entity may be determined from the image included in the email communication by comparing the image to known logo information stored by the email security system in relation to a number of brands. In some cases, the claimed source entity may be determined from the image included in the email communication using computer vision techniques such as optical character recognition (OCR). In some embodiments, the claimed source entity is determined based on information included as text in a body or attachment of the email communication. For example, the claimed source entity may be determined to be a brand entity based on a context in which a reference to the brand entity is presented within the text.

At 606, the process 600 may involve determining a domain associated with the electronic communication. In some embodiments, a domain associated with an electronic communication may be determined based on an address (e.g., a sender address or return path address) associated with the electronic communication. For example, the email security system may determine a domain as the domain from which the electronic communication originated. In some embodiments, a domain may be determined based on a link included within the electronic communication. For example, if a URL is included within the electronic communication, then the domain may be determined to be a domain on which a website is hosted that is directed to by the link.

In some cases, the domain may be determined by virtue of being associated with a "call to action." A call to action may be any enablement of, or suggestion of, an action to be taken by a reader of the electronic communication. For example, a call to action may be a suggestion to click on a particular link referenced by the call to action. In embodiments, natural language processing techniques (e.g., sentiment analysis) may be used to identify a call to action. For example, a call to action may be detected based on one or more words/phrases presented within the electronic communication as well as a context in which those words/phrases are used. If a call to action is detected within an electronic communication directing the reader of that communication to access a link, then the domain of the website to which the link is directed may be determined to be associated with the electronic communication.

At 608, the process 600 may involve determining an owner entity associated with the electronic communication based on the determined domain. In some embodiments, this may involve submitting a query to a second computing device. The second computing device may be a server associated with a domain registry service. For example, the second computing device may be a server operated by ICANN or another suitable organization. The email security system may submit a query (e.g., a WHOIS query) related to the domain determined to be associated with the electronic communication. In this example, the second computing device may respond to the query with information about an entity that registered that domain and/or is currently operating the domain. The entity that registered the domain may be determined to be the owner entity.

At 610, the process 600 may involve determining whether the electronic communication is likely valid (e.g., having originated from the claimed source entity) based on a comparison between the owner entity and the claimed source entity. this, the email security system may compare the owner entity determined at 608 to the claimed source entity determined at 604. If the two entities match, then a determination may be made that the electronic communication is likely to be valid. Otherwise, if the two entities do not match, then a determination may be made that the electronic communication is likely not valid.

At 612, the process 600 may involve performing one or more mitigation techniques. In some cases, such mitigation techniques may involve updating the electronic communication to include an indication of whether the electronic communication is likely valid. This may involve adding an image or watermark to the email communication that indicates a validity status. Upon adding the indication, the process 600 may further involve transmitting the electronic communication to its intended recipient. In other cases, performing mitigation techniques may involve preventing transmission of the electronic communication to the intended recipient.

Figure 7:
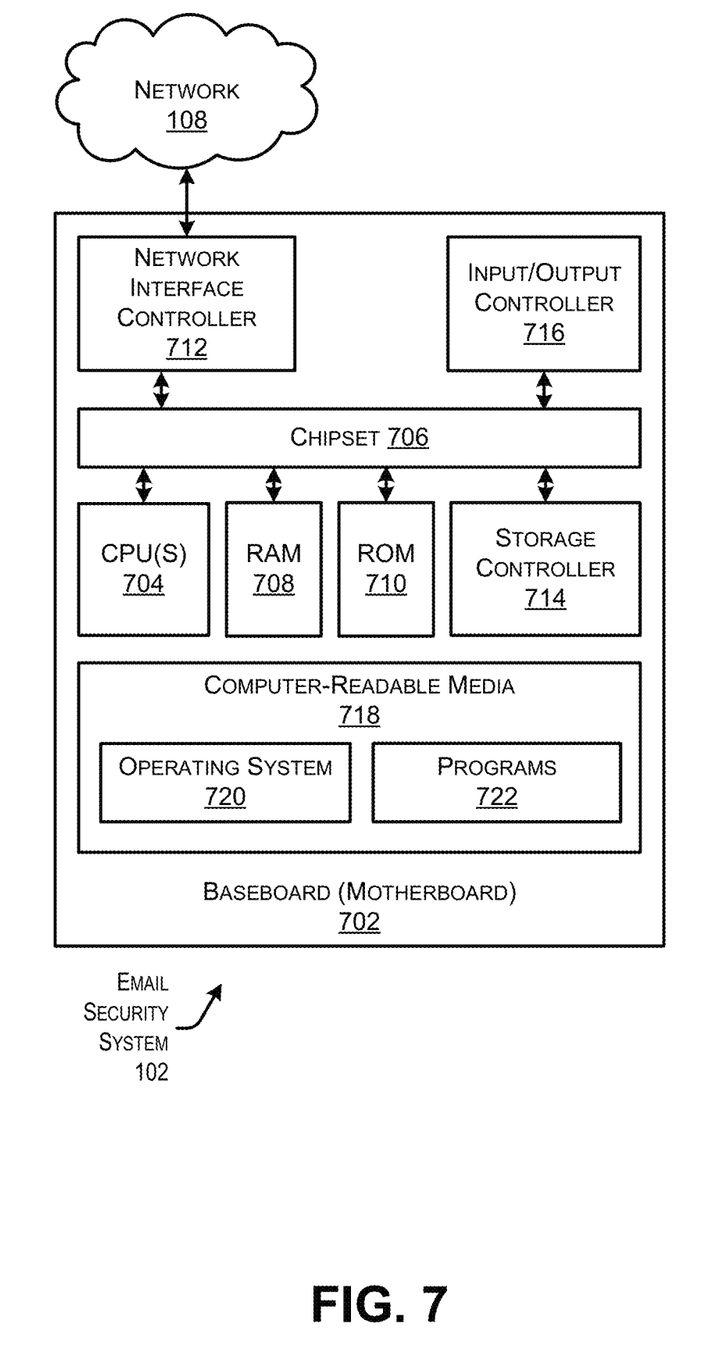
FIG. 7 shows an example computer architecture for an email security system capable of executing program components for implementing the functionality described above.

FIG. 7 shows an example computer architecture for an email security system 102 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The email security system 102 may, in some examples, correspond to a physical server as described herein, and may comprise networked devices such as servers, switches, routers, hubs, bridges, gateways, modems, repeaters, access points, etc.

The email security system 102 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the email security system 102.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the baseboard 702. The chipset 706 can further provide an interface to a computer-readable storage medium such as a read-only memory ("ROM") 710 or non-volatile RAM ("NVRAM") for storing basic routines that help to startup the email security system 102 and to transfer information between the various components and devices. The ROM 710 or NVRAM can also store other software components necessary for the operation of the email security system 102 in accordance with the configurations described herein.

The email security system 102 can operate in a networked environment using logical connections to remote computing devices and computer systems through a network, such as the network 108. The chipset 706 can include functionality for providing network connectivity through a NIC 712, such as a gigabit Ethernet adapter. The NIC 712 is capable of connecting the email security system 102 to other computing devices over the network 108. It should be appreciated that multiple NICs 712 can be present in the email security system 102, connecting the computer to other types of networks and remote computer systems.

The email security system 102 can be connected to a storage device 718 that provides non-volatile storage for the computer. The storage device 718 can store an operating system 720, programs 722, and data, which have been described in greater detail herein. The storage device 718 can be connected to the email security system 102 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The email security system 102 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the email security system 102 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The email security system 102 can further read information from the storage device 718 by detecting the physical states or characteristics of one or more particular locations within the physical storage units.

In addition to the mass storage device 718 described above, the email security system 102 can have access to other computer-readable storage media to store and retrieve information, such as program modules, data structures, or other data. It should be appreciated by those skilled in the art that computer-readable storage media is any available media that provides for the non-transitory storage of data and that can be accessed by the email security system 102. In some examples, the operations performed by devices as described herein may be supported by one or more devices similar to email security system 102. Stated otherwise, some or all of the operations performed by an edge device, and/or any components included therein, may be performed by one or more computer devices operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the email security system 102. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the email security system 102.

In one embodiment, the storage device 718 or other computer-readable storage media is encoded with computer-executable instructions which, when loaded into the email security system 102, transform the computer from a general-purpose computing system into a special-purpose computer capable of implementing the embodiments described herein. These computer-executable instructions transform the email security system 102 by specifying how the CPUs 704 transition between states, as described above. According to one embodiment, the email security system 102 has access to computer-readable storage media storing computer-executable instructions which, when executed by the email security system 102, perform the various processes described above with regard to the other figures. The email security system 102 can also include computer-readable storage media having instructions stored thereupon for performing any of the other computer-implemented operations described herein.

The email security system 102 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the email security system 102 might not include all of the components shown in FIG. 7, can include other components that are not explicitly shown in FIG. 7, or might utilize an architecture completely different than that shown in FIG. 7.

As described herein, the email security system 102 may include one or more hardware processors (e.g., CPUs 704) configured to execute one or more stored instructions. The processor(s) may comprise one or more cores. Further, the email security system 102 may include one or more network interfaces configured to provide communications between the email security system 102 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 108. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 722 may comprise any type of programs or processes to perform the techniques described in this disclosure. The programs 722 may comprise any type of program that causes the email security system 102 to perform techniques for communicating with other devices using any type of protocol or standard usable for determining connectivity. These software processors and/or services may comprise one or more of the modules as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, a software module (e.g., a module) contains computer executable instructions executed by the processor to perform functions provided by one or more routing protocols. In various embodiments, a module may employ one or more supervised, unsupervised, or semi-supervised machine learning models. Generally, supervised learning entails the use of a training set of data, as noted above, that is used to train the model to apply labels to the input data. For example, the training data may include sample input data that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that can be employed may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, by a service provider computing device, an electronic communication directed to an intended recipient;
   determining, by the service provider computing device based on information included in the electronic communication, a list of multiple different claimed source entities;
   determining, by the service provider computing device, at least one interactive element included within the electronic communication is configured to direct a user to a linked website location;
   determining, by the service provider computing device, a domain associated with the linked website location;
   determining, by the service provider computing device, an owner entity associated with the domain, the owner entity having registered the domain with a domain registry service;
   determining, by the service provider computing device, whether the electronic communication is valid based on a comparison between the owner entity and individual claimed source entities of the list of multiple different claimed source entities; and
   upon determining that the electronic communication is not valid, performing, by the service provider computing device, one or more mitigation techniques.

2. The method of claim 1, wherein the claimed source entity is determined based on information included in one or more images included in the electronic communication.

3. The method of claim 2, wherein the one or more images included in the electronic communication are determined to correspond to a logo for a brand, the list of multiple different claimed source entity entities determined to include at least an entity associated with the brand.

4. The method of claim 1, wherein performing one or more mitigation techniques comprises:
   updating, by the service provider computing device, the electronic communication to include an indication that the electronic communication is not valid; and
   transmitting, by the service provider computing device, the electronic communication to the intended recipient.

5. The method of claim 1, wherein the linked website location is included in a body of the electronic communication.

6. The method of claim 1, wherein the list of multiple different claimed source entities is determined from one of a sender address included in a header of the electronic communication or a return-path address for the electronic communication.

7. The method of claim 1, wherein the owner entity associated with the domain is determined by communicating with at least one second computing device.

8. The method of claim 7, wherein the at least one second computing device comprises a domain registry server that manages the domain registry service.

9. The method of claim 8, wherein performing one or more mitigation techniques comprises preventing transmission of the electronic communication to the intended recipient.

10. An email security system comprising:
    one or more processors; and
    one or more non-transitory computer-readable media storing computer-executable instructions that, when executed by the one or more processors, cause the email security system to perform operations comprising:
       receiving an electronic communication directed to an intended recipient;
       determining, based on information included in the electronic communication, a list of multiple different claimed source entities;
       determining at least one interactive element included within the electronic communication is configured to direct a user to a linked website location;
       determining, based on information included in the electronic communication, a domain associated with the linked website location;
       determining an owner entity associated with the domain, the owner entity having registered the domain with a domain registry service;
       determining whether the electronic communication is valid based on a comparison between the owner entity and individual claimed source entities of the list of multiple different claimed source entities; and
       performing one or more mitigation techniques based on whether the electronic communication is valid.

11. The email security system of claim 10, wherein performing one or more mitigation techniques comprises:
    updating the electronic communication to include an indication as to whether the electronic communication is valid; and
    transmitting the electronic communication to the intended recipient.

12. The email security system of claim 11, wherein the indication as to whether the electronic communication is valid comprises a watermark or symbol.

13. The email security system of claim 10, wherein the list of multiple different claimed source entities is determined based on information included in an image within the electronic communication.

14. The email security system of claim 13, wherein the information within the image included in the electronic communication is processed using one or more machine learning models.

15. The email security system of claim 10, wherein the list of multiple different claimed source entities is determined based on at least one of a sender address or a return-path address associated with the electronic communication.

16. One or more non-transitory computer-readable media storing computer-executable instructions that, when executed by one or more processors, cause the one or more processors to perform operations comprising:

receiving an electronic communication directed to an intended recipient;

determining, based on information included in the electronic communication, a list of multiple different claimed source entities;

determining, by the service provider computing device, at least one interactive element included within the electronic communication is configured to direct a user to a linked website location;

determining, based on information included in the electronic communication, a domain associated with the linked website location;

determining an owner entity associated with the domain, the owner entity having registered the domain with a domain registry service;

determining whether the electronic communication is valid based on a comparison between the owner entity and individual claimed source entities of the list of multiple different claimed source entities; and performing one or more mitigation techniques based on whether the electronic communication is valid.

17. The one or more non-transitory computer-readable media of claim 16, wherein the list of multiple different claimed source entities is determined based on information included in one or more images corresponding to a logo for a brand included within the electronic communication, and wherein the list of multiple different claimed source entities is determined to include an indication of the brand.

18. The one or more non-transitory computer-readable media of claim 16, wherein the list of multiple different claimed source entities is determined based on a context in which a reference to a brand entity is presented within a body of the electronic communication, and wherein the list of multiple different claimed source entities is determined to include an indication of the brand entity.

19. The one or more non-transitory computer-readable media of claim 16, wherein the interactive element included within the electronic communication comprises one of a button or a machine-readable code.

* * * * *